July 2, 1935.  A. C. GRIDLEY  2,006,500
REVERSING GEARING
Filed July 25, 1932  2 Sheets-Sheet 1
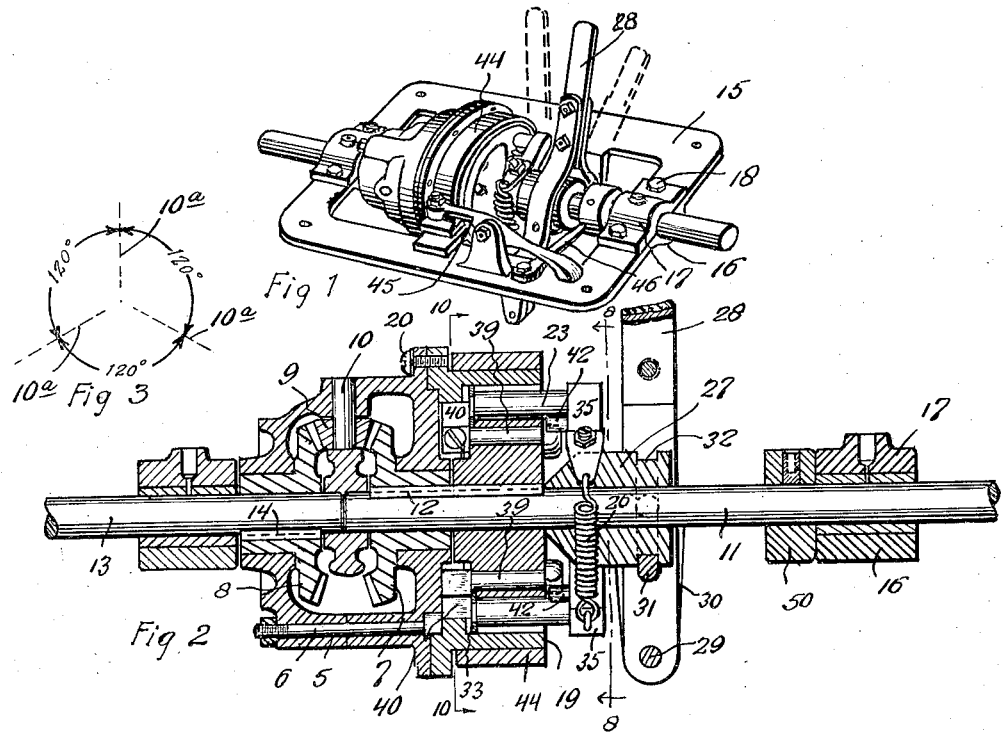
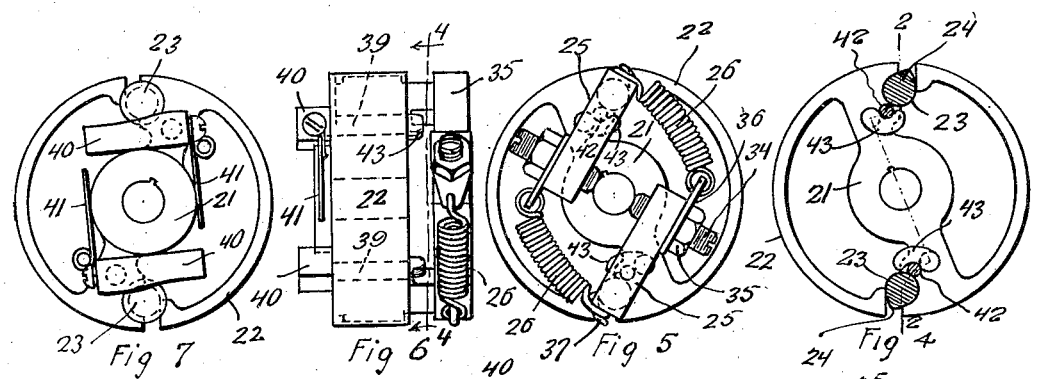
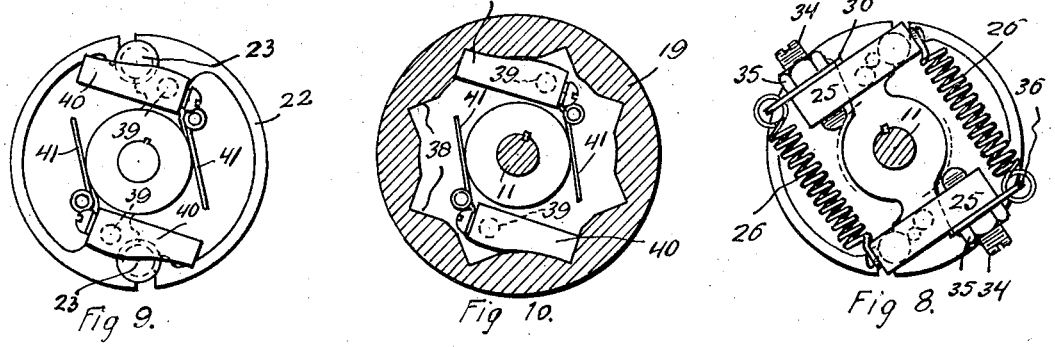
Adelbert C. Gridley INVENTOR.
J Stanley Burch ATTORNEY.

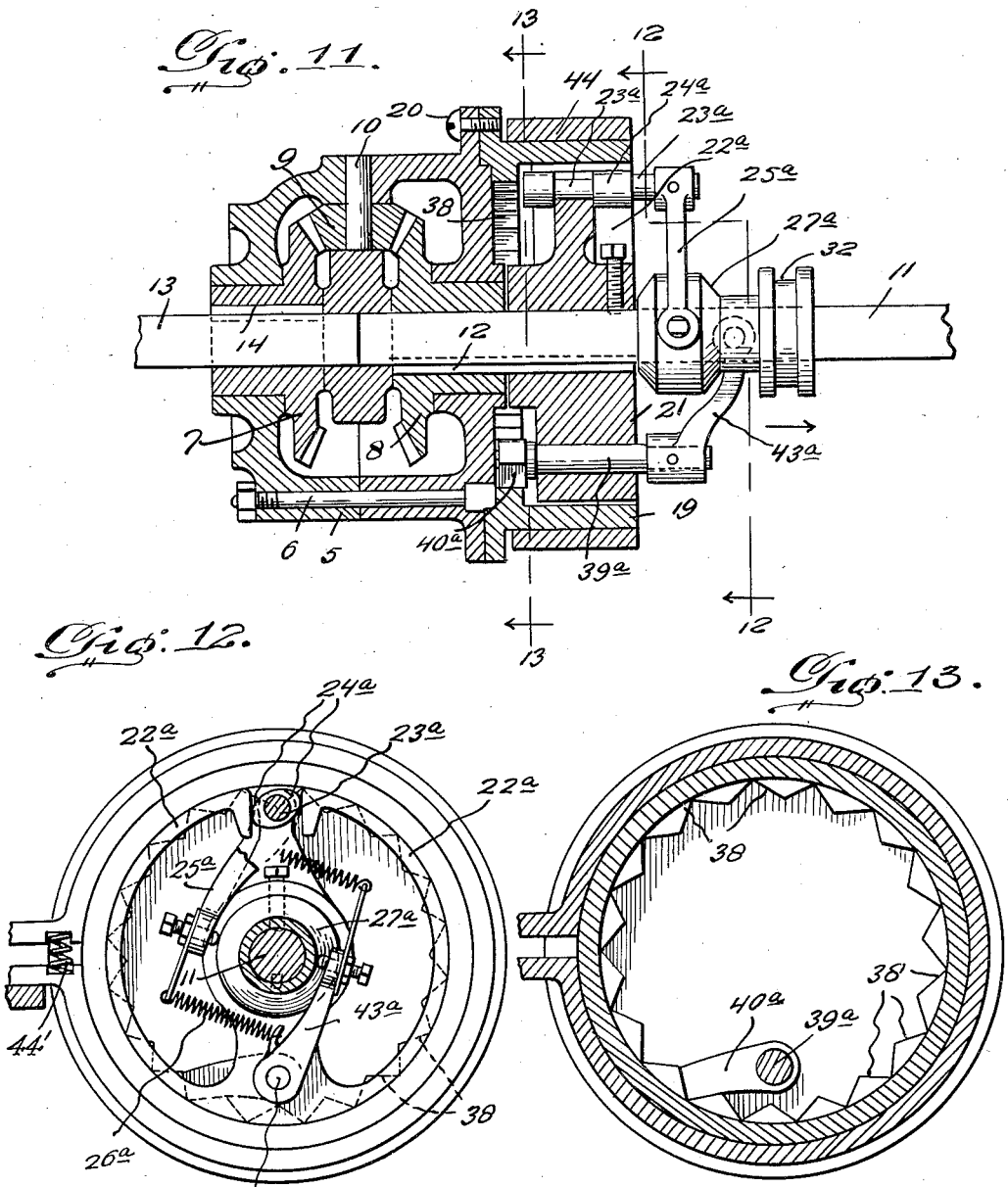

Patented July 2, 1935

2,006,500

UNITED STATES PATENT OFFICE 2,006,500

REVERSING GEARING

Adelbert C. Gridley, Costa Mesa, Calif.

Application July 25, 1932, Serial No. 624,585

3 Claims. (Cl. 192—53)

This invention relates to reversing gearing of the planetary type involving a driving shaft with a bevel gear secured thereto, a driven shaft with a second bevel gear secured thereto, pinions arranged between said bevel gears which are borne by a rotatable housing or carrier, and a clutch and a brake for said rotatable housing or pinion carrier.

The primary object of the present invention is to generally simplify and improve reversing gearings of the above kind, whereby the same will be simple and durable in construction, comparatively inexpensive to manufacture or repair, and efficient and reliable in operation.

More particularly, the present invention provides a reversing gearing including a differential gearing of the planetary type having a rotatable pinion carrier or housing, and a novel and efficient brake and clutch unit borne by the driving shaft of the differential gearing at one end of the pinion carrier or housing of the latter, said brake and clutch unit embodying a combined brake and clutch drum secured to the pinion carrier or housing of the differential gearing and a manually operable clutch element keyed to the driving shaft within said brake and clutch drum for cooperation with the latter.

A further object of the invention is to provide, in a reversing gearing of the above kind, an improved brake and clutch unit in which manually operable means is provided to frictionally clutch and unclutch the driving shaft and its bevel gear to and from the brake and clutch drum and the pinion carrier or housing of the differential gearing, and means including centrifugally operated dogs to positively clutch said driving shaft and its gear to the brake and clutch drum and pinion carrier or housing after the latter have attained a predetermined speed approximating that of the driving shaft, thus obtaining the advantages of a positive drive when the driven shaft is driven directly.

A still further object of the present invention is to provide means for maintaining the driving dogs inoperative when the friction clutch member is released and the brake band is applied, thereby securing a friction drive when the driven shaft is driven reversely at a slower speed.

Other objects and advantages of the present invention will become apparent from the following description when considered in connection with the accompanying drawings, in which:

Figure 1 is a perspective view of a reversing gearing embodying the present invention.

Figure 2 is an enlarged longitudinal section thereof, mainly taken on a cutting plane indicated by the line 2—2 of Figure 4.

Figure 3 is a diagrammatic view illustrating the relative arrangement of the axes of the planetary pinion of the differential gearing about the driving and driven shafts.

Figure 4 is a section on line 4—4 of Figure 6.

Figure 5 is an elevational view looking toward the left of Figure 6.

Figure 6 is a side elevational view of the friction clutch element and associated parts carried by the driving shaft.

Figure 7 is an elevational view looking toward the right of Figure 6.

Figure 8 is a sectional view on line 8—8 of Figure 2, with parts omitted.

Figure 9 is a view similar to Figure 7 with the driving dogs projected to operative or driving position.

Figure 10 is a transverse section on line 10—10 of Figure 2.

Figure 11 is a view similar to Figure 2 of a modified form of the invention.

Figure 12 is a transverse section on line 12—12 of Figure 11; and

Figure 13 is a section on line 13—13 of Figure 11.

Referring in detail to the drawings, 5 indicates the pinion carrier or housing of a planetary differential gearing which is shown as formed of two transverse half sections secured together by longitudinal bolts 6 and in each end of which is journaled the hub of a bevel gear, which bevel gears are respectively indicated at 7 and 8. As is usual with gearings of this type, the housing 5 carries a plurality of pinions 9 interposed between and constantly meshing with the bevel gears 7 and 8, said pinions 9 being journaled on pins 10 held between the sections of the housing 5 and arranged at uniformly spaced intervals about the axis of gears 7 and 8 as indicated diagrammatically in Figure 3 at 10a. A driving shaft 11 is keyed at 12 in the hub of bevel gears 7 and abuts the inner end of a driven shaft 13 keyed at 14 in the hub of the bevel gear 8. The present gearing includes an open elongated frame 15 within and adjacent one end of which the differential gearing is arranged, the shafts 11 and 13 being respectively journaled in bearings at the ends of the frame 15, each of which includes a lower part 16 formed by a downwardly offset portion of the frame 15 and an upper part consisting of a cap plate 17 bolted in place as at 18.

The inner end of housing 5 is rabbeted about the outer edge thereof to form a projecting major central portion as shown clearly in Figure 2. The invention further includes a combined brake and clutch embodying a combined brake and clutch drum 19, one end of which is flanged and bolted to the adjacent flanged end of housing 5 as at 20, and also counterbored to fit over the projecting end portion of the housing 5, whereby the drum 19 and housing 5 are effectively rigidly joined together. The brake and clutch unit further includes a member or element 21 keyed at 12 on the driving shaft 11 within the drum 19 and having normally contracted resilient arcuate parts 22 adapted to be expanded into frictional engagement with the inner surface of said drum 19 to frictionally clutch the driving shaft 11 and bevel gear 7 to drum 19 and housing 5, whereby the pinions 19 will be caused to bodily rotate with the shaft 11 and correspondingly rotate bevel gear 8 to afford a direct drive between the driving shaft 11 and driven shaft 13. Manually operable means is provided to expand the members 22 of the clutch element 21, such means consisting of cam shafts 23 journaled in the element 21 and having cams 24 arranged to move into engagement with the free ends of the clutch members 22. Oppositely projecting arms 25 are rigid with the outer projecting ends of the cam shafts 23, adjacent ends of which are connected by tension springs 26 by means of which the shafts 23 are normally positioned with their cams 24 out of engagement with the clutch members 22 for permitting the latter to normally assume their contracted disengaged position. A cone 27 is slidably mounted on the driving shaft 11 for movement inwardly between the arms 25 and outwardly from between the same, the arrangement being such that when the cone 27 is moved inwardly between the arms 25, the latter are swung against the tension of springs 26 so as to rock the cam shafts 23 and cause their cams 24 to engage the ends of the clutch members 22 for expanding the latter into gripping engagement with the inner surface of drum 19. Obviously, when the cone 27 is moved in the reverse direction, the springs 26 will swing the arms 25 in the opposite direction to release the cams 24 and permit contraction of the clutch members 22 out of engagement with drum 19. A lever 28 is provided for operating the cone 27, the same having a bifurcated lower end straddling said cone and passing downwardly through the frame 15 where its legs are pivoted at 29 to depending ears 30 carried by the frame 15, a yoke 31 having its ends pivoted in the legs of the bifurcated end of lever 28 being engaged at its intermediate arcuate portion in an annular groove 32 provided in the outer end portion of cone 27. The shafts 23 have reduced inner ends on which are secured washers 33 that engage the inner side of the clutch element 21 to retain the shafts 23 against outward displacement from operative position. Extending through the free end portions of levers 25 are set screws 34 arranged to engage the surface of cone 27 and adjustable through the arms 25 for properly adjusting the throw of the latter. In other words, by adjusting the set screws 34, the arms 25 may be properly adjusted to position the cams 24 so that the latter will properly expand the clutch members 22 when the cone 27 is moved inwardly toward the element 21. Lock nuts 35 are threaded on the outer ends of the set screws 34 to lock the latter in properly adjusted position, and suitable plates 36 are clamped between the nuts 35 and the arms 25 to provide means for anchoring the adjacent ends of springs 26 to said arms 25. The other ends of the arms 25 adjacent their pivots or shafts 23 may be formed with suitable hooks 37 by means of which the other ends of the springs 26 may be anchored to said arms 25.

The drum 19 has a circular series of notches 38 formed therein adjacent its inner end, and pivoted in the clutch element 21 are rock shafts 39 having dogs 40 on the inner ends thereof arranged to swing outwardly into engagement with the notches 38 so as to provide a positive driving connection between shaft 11 and housing 5 through clutch element 21 and drum 19, in a manner which will presently become apparent. Attached at one end to each of the dogs 40 is a spring 41 having a coiled intermediate portion and having its other end bearing against the hub of clutch element 21, whereby the associated dog is normally swung inwardly to the position of Figure 7, out of engagement with the notches 38. The springs 41 are relatively weak so as to permit outward swinging movement of the dogs 40 under centrifugal force when the shaft 11 and clutch element 21 have attained a sufficiently high predetermined speed after the members 22 have been expanded to frictionally clutch the shaft 11 to the drum 19. In this way a friction driving connection between the shaft 11 and housing 5 is automatically followed by a positive driving connection therebetween, which positive driving connection is automatically released upon reducing the speed of the shaft 11 to a predetermined extent or discontinuing its rotation. In other words, the dogs 40 will swing inwardly out of engagement with the notches 38 under the influence of springs 41 when the centrifugal force acting upon said dogs is insufficient to overcome the action of said springs 41. Projecting inwardly from the inner side of arms 25 adjacent the shafts 23 are pins 42 arranged to cooperate in a peculiar manner with arcuate arms 43 rigid with the adjacent outer ends of rock shafts 39. The arrangement is such that when the shafts 23 are rotated to expand the clutch members 22, the pins 42 are moved out of the path of arms 43 so as to permit turning of shafts 39 and outward swinging movement of dogs 40 under the influence of centrifugal force. At the same time, the arrangement is also such that when the shafts 23 are turned by springs 26 to permit contraction of clutch members 22, the pins 42 move the arms 43 so as to positively swing the dogs 40 out of engagement with the notches 38, or to engage the arms 43 and prevent movement of said dogs 40 outwardly into engagement with the notches 38, depending upon the condition of the parts. In this way, a friction driving connection must be provided between the driving shaft 11 and housing 5 by expansion of clutch elements 22, before a positive driving connection can be effected between these parts by the dogs 40, a positive driving connection between those parts being prevented positively when the friction clutch elements 22 are released from drum 19.

Suitably carried by the frame 15 is a brake band 44 which encircles the drum 19 and is operable by a lever 45 pivoted on the frame 15 to grip the drum 19 and prevent rotation of the latter and the housing 5. The brake band 44 is shown as tensioned to normally expand to released position by means of a spring 44' as shown in Figure 12, but it may be so expanded by any spring means common to brake construction of this type, and the lever 45 is pivoted intermediate its ends to the frame 15 and has one end operatively connected to an end of the band 44. The other end of lever 45 is arranged in the path of a horizontally swinging lever 46 also pivoted on the frame 15 and projecting inwardly in the path of lever 28. The lever 46 is arranged at the outer side of lever 28 so as to be moved by the latter when said lever 28 is swung outwardly to release the arms 25 and permit disengagement of clutch members 22 from drum 19. The lever 46 is thus moved by lever 28 so as to operate lever 45 and apply the brake band 44 to drum 19 when the clutch members 22 are released. When this is done, the drum 19 and housing 5 are unclutched from the shaft 11, but are restrained against rotation by brake band 44, thus causing a reverse drive of driven shaft 13. When this reverse drive of shaft 13 takes place, the gear 7 rotates in one direction so as to turn the pinions 9 and cause them to turn the gear 8 and shaft 13 in a reverse direction. By properly positioning lever 46 with respect to levers 45 and 28, the clutch members 22 may be released to unclutch shaft 11 from drum 19 without applying brake 44, thus placing the gearing in neutral condition wherein no drive is transmitted to shaft 13, the housing 5 freely turning about shaft 13. Further outward movement of lever 28 from the full line position of Figure 1 will then cause engagement of band 44 with drum 19 to effect the reverse drive described above. As before mentioned, the direct drive is effected by moving the lever 28 inwardly from the full line position of Figure 1, in which position the clutch members 22 are engaged with drum 19 and brake band 44 is released therefrom. The bolts 6 have round heads cut away at one side to engage the inner end of drum 19 as shown in Figure 2, whereby turning of the bolt 6 is prevented when the housing 5 and drum 19 are assembled. An end of the housing 5 abuts the end of the frame 15 adjacent the left hand bearing of frame 15 in Figures 1 and 2, while an adjustable collar 50 is secured on the driving shaft 11 to abut the frame 15 at the opposite end so as to prevent any endwise play of the moving parts relative to frame 15. The frame 15 is of course suitably apertured for convenience in securing the same to a support or frame part of a device or apparatus in which the reversing gearing is employed.

In the construction of Figures 11 to 13 inclusive, the construction of the differential gearing is the same as disclosed in Figures 1 and 2, and the parts of this differential gearing are given the same reference characters in both forms of the invention. In this modified form of the invention, however, a driving dog 40a for engagement with the notches 38 of the drum 19 is fixed on the inner end of a rock shaft 39a journaled in the clutch element 21, the outer projecting end of rock shaft 39a having an arm 43a secured thereon and extending inwardly for cooperation with the outer end of a double cone 27a slidably mounted on the driving shaft 11. Also, the clutch members 22a have free ends which are adjacent and against which operate the opposed cams 24a of a cam shaft 23a journaled in the clutch element 21. An arm 25a is secured on the outer projecting end of cam shaft 23a and extends inwardly for cooperation with the inner end of the double cone 27a. The arms 43a and 25a are connected by springs 26a so that they are normally swung toward each other and opposite sides of cone 27a so as to normally permit release of the clutch members 22a from drum 19. The arrangement is such that when the cone 27a is moved outwardly or away from the clutch element 21, it swings the arm 43a so as to release the dog 40a from notches 38, swinging of arm 25a being simultaneously permitted to release cams 24a and permit contraction of clutch members 22a out of engagement with drum 19. Also, when the cone 27a is moved in the opposite direction toward clutch element 21, arm 25a is swung so as to cause expansion of the clutch members 22a into frictional engagement with drum 19. When the latter takes place the arm 43a is released from cone 27a so that the dog 40a is free to swing outwardly under the action of springs 26a or centrifugal force into engagement with the notches 38. As with the form of the invention shown in Figures 1 to 10 inclusive, therefore, the embodiment illustrated in Figures 11 to 13 inclusive involves the principle of preventing a positive drive between driving shaft 11 and drum 19 when the clutch members 22a are released, and the automatic attainment of a positive driving connection between these parts after shaft 11 is frictionally clutched to drum 19 by expansion of clutch members 22a. This form of the invention may embody the same mounting frame 15 and operating lever 28 as disclosed in the form of Figures 1 and 2, together with the same levers 45 and 46 for operation of the brake band 44, these parts being omitted from Figure 11 to 13 inclusive merely for the sake of simplicity. Obviously, the showing of one shaft 39a and associated parts 40a and 43a, as well as the showing of only one cam shaft 23a and associated parts 23a and 25a is merely adopted for sake of simplicity, it being apparent that these parts can be duplicated or provided in a plurality of more than two if found desirable.

From the foregoing description, it is believed that the construction and operation as well as the advantages of the present invention will be readily understood and appreciated by those skilled in the art. It will be particularly noted, however, that the invention provides a desirable feature of automatically effecting a positive direct drive immediately following the clutching of the pinion carrier and driving shaft through friction means, the occurrence of a positive drive being at the same time prevented when the driving shaft and pinion carrier are unclutched. In addition, the invention provides a very simple and durable arrangement and assemblage of parts which may be conveniently and cheaply manufactured or repaired, and which will not readily get out of order. Changes in the form and arrangement of parts as illustrated and described are contemplated within the spirit and scope of the invention as claimed.

What I claim as new is:

1. In a clutch mechanism, a driving shaft, a clutch drum mounted for rotation relative to said driving shaft, a clutch element keyed to said driving shaft and having friction clutch members normally contracted out of engagement with said drum, a cam shaft operable for expanding said clutch members into engagement with said drum to provide a friction drive connection between the driving shaft and the drum, manually operable means for operating said cam shaft to engage said clutch members with the drum, a rock shaft journaled in said clutch element and carrying a driving dog, said drum having internal notches engageable by said dog for providing a positive driving connection between the driving shaft and said drum, a lateral arm carried by said rock shaft, and a pin movable with the cam shaft into and out of the path of said arm for preventing engagement of the dog with the drum when the clutch members are released and for permitting engagement of the dog with the drum when the clutch members are engaged.

2. In a clutch mechanism, a driving shaft, a clutch drum mounted for rotation relative to said driving shaft, a clutch element keyed to said driving shaft and having friction clutch members normally contracted out of engagement with said drum, a cam shaft operable for expanding said clutch members into engagement with said drum to provide a friction drive connection between the driving shaft and the drum, manually operable means for operating said cam shaft to engage said clutch members with the drum, a rock shaft journaled in said clutch element and carrying a driving dog, said drum having internal notches engageable by said dog for providing a positive driving connection between the driving shaft and said drum, a lateral arm carried by said rock shaft, and a pin movable with the cam shaft into and out of the path of said arm for preventing engagement of the dog with the drum when the clutch members are released and for permitting engagement of the dog with the drum when the clutch members are engaged, and a spring normally holding said dog out of engagement with the drum, said spring being of relatively weak tension to permit engagement of the dog with the drum under the action of centrifugal force when the driving shaft and drum attain a predetermined speed of rotation.

3. In a clutch mechanism, a driving shaft, a clutch drum mounted for rotation about said driving shaft and having internal notches, a clutch element keyed on the driving shaft within said drum and having normally contracted friction clutch members expansible into engagement with the inner surface of the drum, a frame in which said driving shaft is journaled, cam shafts journaled in said clutch element and operable for expanding said clutch members, arms rigid with the outer ends of said cam shafts, springs yieldingly moving said arms inwardly toward the driving shaft for permitting release of the clutch members from the drum, a cone slidable on said driving shaft and movable between the arms to rotate the cam shafts and cause expansion of the clutch members into engagement with the drum, manually operable means including a lever pivoted to the supporting frame for moving the cone to cause expansion of the clutch members, rock shafts journaled in the clutch element and carrying dogs movable outwardly under centrifugal force into engagement with the notches of the drum, springs normally swinging said dogs out of engagement with the drum, lateral arms on said rock shafts, and pins carried by the arms of the cam shafts and movable into and out of the paths of the last-named arms of the rock shafts to prevent engagement of the dogs with the drum when the clutch members are released from the latter and to permit engagement of said dogs with the drum when said clutch members are engaged with said drum.

ADELBERT C. GRIDLEY.